Jan. 26, 1937.  E. R. LYNES  2,069,012
VEHICLE JACK
Filed Aug. 6, 1935
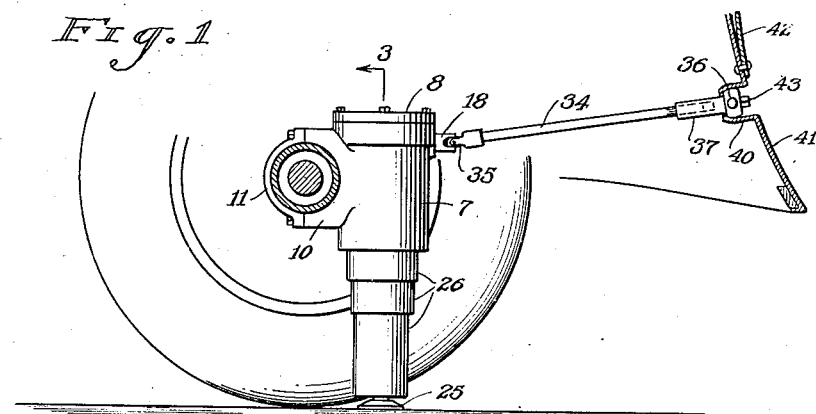
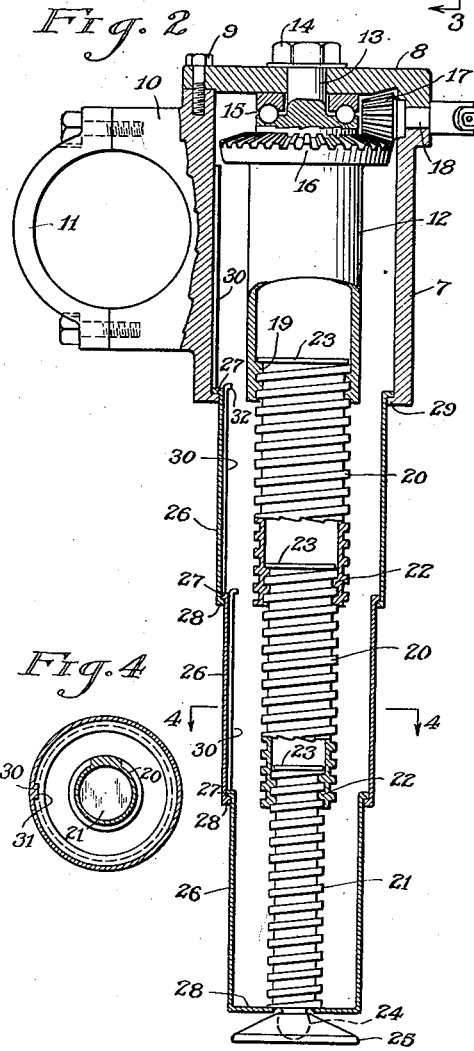
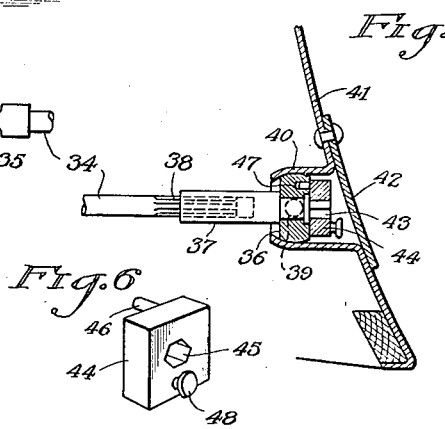
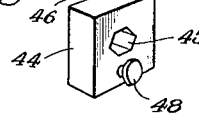
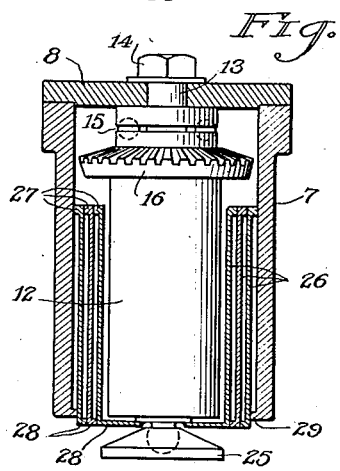
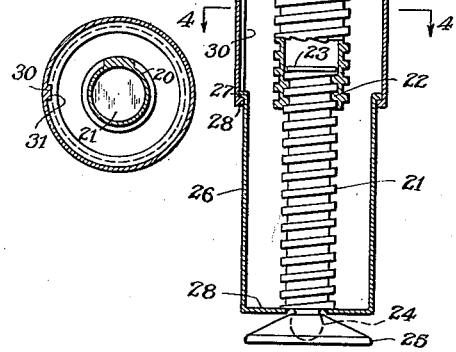
Edwin R. Lynes
INVENTOR
BY Victor J. Evans & Co.
ATTORNEY Patented Jan. 26, 1937

2,069,012

UNITED STATES PATENT OFFICE 2,069,012

VEHICLE JACK

Edwin Ralph Lynes, Westford, N. Y.

Application August 6, 1935, Serial No. 34,994

1 Claim. (Cl. 254—102)

This invention relates to vehicle jacks and has for one of its objects the provision of a novel form of jack and operating means for same, the arrangement of which makes it particularly adaptable as permanent equipment of a vehicle in that it is the intention to provide an individual jack for each wheel or pair of wheels of the vehicle.

Another object of my invention is to provide a lifting jack which, being permanently affixed to a vehicle axle will contract to a minimum when out of service so as not to reduce the road clearance of the vehicle in motion.

A further object of my invention is to provide a vehicle jack in which the working parts are completely protected against dirt and road splash whether the jack be extended or contracted, thus to permit the thorough lubrication of the working parts thereof to assure long and efficient service.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claim.

In the drawing:

Fig. 1 is a side elevational view of my jack attached to a vehicle in position preparatory to raising the wheel, part of the vehicle being shown in section.

Fig. 2 is a vertical central sectional view thru my jack with parts in elevation.

Fig. 3 is a sectional view taken on line 3—3 of Fig. 1 but with the jack completely contracted.

Fig. 4 is a transverse sectional view taken on line 4—4 of Fig. 2.

Fig. 5 is an elevational view partly broken away illustrating the connection of the jack operating means to the vehicle; and Fig. 6 is a perspective view of the locking member shown in Fig. 5.

Referring now to the drawing for a more detailed description thereof, the numeral 7 indicates the casing of my jack which is preferably cylindrical in shape and is provided at its upper end with a removable cover plate 8 secured to same as by the cap screws 9. The use of my jack contemplates its permanent attachment to the vehicle axle, for which purpose a bracket 10 is integrally formed on the casing 7, which bracket is provided with suitable means such as the clamp cap 11 to effect the attachment to the vehicle's axle. The bracket 10 and the cap 11 are shaped to accommodate a tubular axle, it being noted that the attachment means may be varied to suit the type of axle to which the jack is to be attached.

Within the casing 7 is rotatably supported a cylinder 12 by having a stud 13 axially projecting from same journaled in the cover plate 8. A nut 14 is threadedly engaged on the stud 13 to retain the cylinder in place, the thrust of the cylinder being supported on the annular ball bearing ring 15. The cylinder 12 also carries at its upper end a bevel gear 16 which is in mesh with a pinion gear 17, the shaft 18 of which extends thru the side of the casing 7.

The cylinder 12, being of tubular form, is provided at its lower end with an interiorly threaded band 19. The extensible portion of my jack comprises at least one externally threaded tube 20 (I have shown two) and an externally threaded rod 21. Each of the tubes 20 are also provided with an internal thread band 22 at their lower ends. Each of the tubes 20 are adapted to threadedly telescope within the upper adjacent tube, the topmost tube 20 being adapted to threadedly telescope into the cylinder 12 and the rod 21 being adapted to threadedly telescope into the lowermost tube 20. The tubes 20 and the rod 21 have at their upper ends collars 23 which form stops to limit the extension of the respective screw members. The lower end of the rod 21 terminates in a ball 24 which provides a universal support for the jack shoe 25.

My jack is also fitted with an extensible housing to surround the jack screws 20 and 21 when extended. This extensible housing comprises a suitable number of telescoping sleeves 26. At the upper end of each of the sleeves 26 is formed an outwardly projecting flange 27 and at the lower end of each sleeve is formed an inwardly projecting flange 28. With the jack fully extended the flanges 27 and 28 of the sleeves engage with each other to limit the extension of the latter. The flange 27 of the uppermost sleeve engages with an inwardly extending flange 29 formed at the bottom of the casing 7. The flange 28 of the lowermost sleeve 26 is rigidly attached to the lower end of the rod 21. Secured to the interior of the intermediate sleeves 26 and the casing 7 are keys 30 which slide in keyways 31 cut in the adjacent flanges 27. Each key 30 is hooked at its upper end to form a stop 32 in order to limit the upward movement of the corresponding sleeve.

The operation of the lifting mechanism of my jack is as follows, assuming that the jack is fully contracted as shown in Fig. 3. The cylinder 12 is rotated thru the bevelled gears 16 and 17. The rod 21 is held from turning by the interlocking relation of the respective sleeves 26. Turning of the cylinder 12 will thus cause the rod 21 to be extended until its collar 23 engages with the thread band 22. During the extension of the rod 21 the tubes 20 are being rotated with the cylinder 12. When the rod 21 is fully extended the engagement of its collar 23 effects a holding of the adjacent sleeve 20, thus causing the said sleeve to become extended until its collar 23 limits the movement, whence the succeeding tube 20 will be caused to be extended. It will be apparent that during the extension of the tubes 20 and rod 21 the corresponding extension of the sleeves 26 will be effected. During this extension the keys 30 sliding in the keyways 31 prevent the rotation of the lowermost sleeve 26.

To provide a more suitable means for the operation of my jack, particularly the rotation of the pinion gear 17 a rod 34 is arranged so that one end is flexibly connected to the stub shaft 18 by the universal joint 35. In a bearing block 36 is journalled a sleeve 37, which is slidably connected to the opposite end of the rod 34 by the spline joint 38. The bearing block 36 is pivotally supported by trunnions 39 in the walls of a recess 40 appropriately formed in a wall 41 of the body of the vehicle. The interior of the recess 40 is protected by a swingable cover 42 pivoted to the body. A stub shaft extends from the sleeve 37 beyond the bearing block 36 to terminate in a polygonal nut 43 onto which a suitable crank may be engaged to rotate the shaft 34 during the operation of the jack.

Since my jack and its operating mechanism are to be permanently attached to the vehicle, a turning tendency of the rod 34 may occur during the travel of the vehicle. In order to lock the rod 34 in inoperative position a lock block 44 is provided, as shown in Fig. 6, into which block is cut an aperture 45 adapted to fit snugly over the nut 43. A pin 46 projects from the rear face of the block 44 to engage in a suitable recess 47 in the bearing block 36, as shown in Fig. 5. A knob 48 is affixed to the block 44 by which to conveniently install or remove the latter.

What is claimed as new is:

A lifting jack for a vehicle, comprising a casing, a hollow cylinder mounted for rotation in the casing, a plurality of connected telescoping jack sections connected to and receivable in the cylinder, an extensible housing for the jack sections and connected to and movable into and out of the casing, said housing including telescoping sleeves surrounding the jack sections, inwardly directed annular flanges on the lower ends of the sleeves, outwardly directed annular flanges on the upper ends of the sleeves for engagement with the inwardly directed flanges of adjacent sleeves to limit the downward movement of the sleeves, keys secured to certain sleeves and certain flanges having key ways therein to slidably receive the keys, said keys having hooked upper ends providing stops engageable with each other to limit the upward movement of the sleeves, means for rotating the cylinder, means between the cylinder and jack sections and each of the latter for raising and lowering the jack sections upon rotation of the cylinder, a shoe on the lowermost jack section and the flange of the lowermost sleeve being fixed to the lowermost jack section, whereby raising and lowering of the jack sections raises and lowers the sleeves in unison therewith.

EDWIN RALPH LYNES.